United States Patent [19]

Ritter

[11] 4,372,858

[45] Feb. 8, 1983

[54] METHOD OF REGENERATING ION EXCHANGERS

[75] Inventor: Günter Ritter, Melle, Fed. Rep. of Germany

[73] Assignee: Tetra Werke Dr. rer. nat. Ulrich Baensch Gesellschaft mit beschränkter Haftung, Melle, Fed. Rep. of Germany

[21] Appl. No.: 302,593

[22] Filed: Sep. 15, 1981

Related U.S. Application Data

[63] Continuation of Ser. No. 180,704, Aug. 25, 1980, abandoned.

[30] Foreign Application Priority Data

Aug. 29, 1979 [DE] Fed. Rep. of Germany ....... 2934863

[51] Int. Cl.³ .............................................. C02F 1/42
[52] U.S. Cl. ....................................... 210/674; 521/26
[58] Field of Search ............... 210/673, 674, 681, 687, 210/670, 675, 676; 521/26

[56] References Cited

U.S. PATENT DOCUMENTS

| | | | |
|---|---|---|---|
| 2,798,789 | 7/1957 | Spedding | 210/674 |
| 3,392,111 | 7/1968 | Napier | 210/674 |
| 3,454,503 | 7/1969 | Blankenhorn | 210/674 |
| 3,658,729 | 4/1972 | Depree | 210/674 |
| 3,725,259 | 4/1973 | Depree | 210/674 |
| 3,887,498 | 6/1975 | Kuhajek | 210/674 |
| 3,939,071 | 2/1976 | Katzakian | 210/674 |
| 4,071,446 | 1/1978 | Kunin | 210/674 |

*Primary Examiner*—Ernest G. Therkorn
*Attorney, Agent, or Firm*—Becker & Becker, Inc.

[57] ABSTRACT

A method for simple and very precise regeneration of ion exchanger resins with solutions of chelating agents, such as ethylenediaminetetraacetic acid (EDTA), nitrilotriacetic acid (NTA), diaminocyclohexanetetraacetate (DcyTE), or diethylenetriaminepentaacetate (DTPE). The method includes utilization of chelating agents as well as their salts.

2 Claims, No Drawings

METHOD OF REGENERATING ION EXCHANGERS

This is a continuation of application Ser. No. 180,704 filed Aug. 25, 1980, now abandoned.

Ion exchangers have proven especially suitable for preparation, treatment, or purification of aquarium water; especially so-called IDE resins, with ion exchanging characteristics, which provide a clearly graduated affinity relative to the ions of the transition metals, the alkaline earth metals, and the alkali metals (compare German Patent Application P No. 28 19 636.3—corresponding abandoned U.S. Ser. No. 36,234—, and "Chelate Forming Ion Exchangers", R. Hering, Akademie Verlag Berlin 1967 Page 36 et seq). The special characteristics of the so-called ion exchanger resins make possible especially the application in the aquarium sector in so-called "batch methods", that is, the exchanger resin is dipped and left in a suitable water permeable container in the aquarium water. In so doing, the sought natural cation mole ratio is obtained on its own.

The composition of the water under these circumstances can be adjusted exactly to the requirements of the organisms living therein, without having to add additives which do not occur in natural waters.

The already mentioned special affinity of IDE-resins, such as resins containing polyvinyl-N-benzyliminodiacetic acids groups, makes possible the removal of trace elements of the transition series with and without affecting the remaining ions, affecting the entire hardness by increasing or reducing the concentration of magnesium and calcium ions, shifting the $Mg^{++}/Ca^{++}$ ion ratio, as well as changing the $Na^+$- and $K^+$-ion concentrations or shifting the $Na^+/K^+$ ion ratio.

In accordance with the set object, an exchanger resin is utilized which is charged or loaded in an exactly fixed ratio with hydrogen-, sodium-, magnesium-, and/or calcium-ions.

Ion exchangers charged for instance in mole ratios of 200:1 to 1:10 with calcium ions and magnesium ions are used for sweet or fresh water.

An ion exchanger in the $H^+$-form is utilized in case water is desired having a small collective and carbonate hardness.

An exchanger in the $Na^+$-form is used if water is desired having a low collective hardness but high carbonate hardness.

Exchangers charged or loaded with calcium ions and magnesium ions in a mole ratio of 1:1 to 1:2 are used to achieve the conditions corresponding to natural sea water.

Since aquarium technology is utilized predominantly in the private sector, it is important to provide water treatment methods which can be carried out if possible without apparatus expense and additionally in a price-advantageous manner.

Disadvantageous with the method described above is that the ion exchangers to be used must be preloaded or precharged in a very particular ratio of the cations. A simple regeneration of the resins for repeated utilization previously did not seem possible or at least not realizable in the private sector, since reproducible ion ratios up to now were generally only attainable with the use of large electrolyte quantities in so-called column methods. Defined charging or loading conditions were therefore not practically adjustable for the aquarium hobbiest.

It is an object of the present invention to provide a method of regenerating ion exchangers which makes possible a simple and accurate adjustment of desired ion ratios.

It was found that ion exchangers can be regenerated especially simply, while achieving an accurate predeterminable cation ratio, if in place of conventional electrolyte solutions, solutions comprising chelating agents, such as ethylenediaminetetraacetic acid, nitrilotriacetic acid, diaminocyclohexanetetraacetate and/or diethylenetriaminepentaacetate or their alkali-, earthalkali-, or transition metal salts, are used. The mentioned complexing agents are only set forth as examples. Naturally, other chelating agents can also be utilized, whereby the stability constant (pK-value) should be above 1.8. Preferred are chelating agents having a pK value of above 5.

The exchange tendency of the resins is surprisingly so strongly increased by the mentioned measures that they can inventively be very precisely regenerated without difficulties in so-called "batch methods". Accordingly, also the untrained layman has made available to him a means for being able to regenerate consumed exchanger resins at any time. If the exchange resin, which is loaded or charged for example with transition metals, calcium, or magnesium, is offered salts of a chelating agent, such as ethylenediaminetetraacetic acid (EDTA) in solution, then the cations bound on the resin surprisingly form more stable EDTA-complexes, i.e., they go into solution from the resin according to the following formulation:

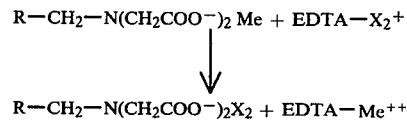

$$R-CH_2-N(CH_2COO^-)_2 Me + EDTA-X_2^+$$
$$\downarrow$$
$$R-CH_2-N(CH_2COO^-)_2X_2 + EDTA-Me^{++}$$

with "Me" being the metal ions bound to the consumed exchanger resin, and $X^+$ the ions which are bound to a chelating agent and are effective in the regeneration solution (counter ions).

To obtain the electro neutrality, the cations offered with the EDTA as counter ions $X^+$ pass over to the resin in an equivalent quantity. By suitable selection of $X^+$, it is possible to precisely regenerate the resin.

The equilibrium shifting of the exchange reaction is now surprisingly so pronounced that even in a "batch method", an extensively complete regeneration can be obtained.

The exchanger resin can inventively be converted completely into the sodium form, for instance by utilizing an EDTA-sodium salt, such as $Na_4(EDTA^{4-})$.

If the free acid ($H_4$—EDTA) is used for regeneration, the regeneration procedure takes somewhat longer because of the difficult solubility of $H_4$—EDTA, but is still capable of being readily carried out in a "batch method".

However, the resin can also be regenerated along with the attainment of, for example, a defined Ca/Mg-ion ratio, if a solution of $K_2$ (Ca EDTA) and $K_2$ (MgEDTA) in a particular mole ratio is utilized.

The teaching of the present invention is the utilization of chelating agents as well as their salts for regenerating ion exchanger resins.

Furthermore, the teaching of the present invention includes a method of regenerating ion exchanger resins, characterized thereby that the loaded or charged resin is treated with a solution which contains at least one chelating agent or salt thereof. Preferred chelating agents are ethylenediaminetetraacetic acid and nitrilotriacetic acid. Preferably the regeneration is carried out in a "batch method".

With the practical application of the "batch method", the resin is packed in a water permeable container, for instance a fine mesh net, a perforated synthetic material container, etc., and is introduced into the aquarium water in charged form. Here in time the desired cation ratio is obtained. When the resin is consumed, it is introduced in packed form into the appropriate EDTA-solution and is left there approximately 4–12 hours with occasional stirring. After passage of this time, the resin is regenerated and can be reintroduced into the aquarium water after a brief rinsing with clear water.

The method has the great advantage that no corroding acids or lyes are used, but rather absolutely nontoxic and harmless solutions of chelating agents are used.

The following examples serve for a more detailed disclosure of the present invention, without in any way restricting or limiting the inventive principle.

EXAMPLE 1

Regeneration of a chelate forming ion exchanger resin 10 ml of the trademarked ion exchanger resin Lewatit, type TP 207, with a capacity of 1.04 Mol/l, charged or loaded with calcium and magnesium ions in a ratio 1:1 (Ca:Mg=1:1), were introduced into 100 ml of a regeneration solution according to Table I, and were stirred $2\frac{1}{4}$ hours by means of a magnetic stirrer. Thereafter, repeated washing with fully demineralized water occurred, and the remaining content of calcium and magnesium ions on the resin was analytically determined. A remaining content of 0 mMol/ml under these circumstances corresponds to a 100% regeneration, while a remaining content of 1.04 mMol/ml means that no regeneration effect whatever was observed.

The following substances were used as chelating agents:
I. The trisodium salt of ethylenediaminetetraacetic acid ($Na_3$ EDTA)
II. The disodium salt of nitrilotriacetic acid ($Na_2$ NTA)
III. The trisodium salt of nitrilotriacetic acid ($Na_3$ NTA)
IV. Disodiumtartrate
V. Sodium polyphosphate (Na $PO_3$)n, n=5
VI. The customary sodium chloride solution was utilized as a standard comparison solution. Under these circumstances, the mole ratio is to be so understood that 1 mMol resin (Ca, Mg) respectively corresponds to 2 mMol NaCl. The mole ratio 1:1 accordingly means 1 mMol resin=2 mMol NaCl.

TABLE I

| Regenerating Solution | pH | Mole Ratio (Ca + Mg):Na x | Regeneration effect |
|---|---|---|---|
| I | 8–8.5 | 1:1 | 65% |
| | | 1:2 | 87% |
| | | 1:5 | 98% |
| II | 7.5 | 1:1 | 35% |
| | | 1:2 | 56% |
| | | 1:5 | 72% |
| III | 10–11 | 1:1 | 53% |
| | | 1:2 | 58% |
| | | 1:5 | 65% |
| IV | 8 | 1:1 | 28% |
| | | 1:2 | 38% |
| | | 1:5 | 34% |
| | | 1:1 | 27% |

TABLE I-continued

| Regenerating Solution | pH | Mole Ratio (Ca + Mg):Na x | Regeneration effect |
|---|---|---|---|
| V | 8 | 1:2 | 38% |
| | | 1:5 | 56% |
| | | 1:1 | 9% |
| VI | 7 | 1:2 | 13% |
| | | 1:5 | 25% |

Table I shows that with the conventional sodium chloride solution, no loading or charging of the ion exchange resin is possible by means of a "batch-method", since at best a regeneration effect of 25% was attained. The regeneration solution I, in contrast, attains a regeneration effect of 98% with an exchange time of only $2\frac{1}{4}$ hours.

EXAMPLE 2

Utilization of EDTA-solutions for regenerating resin bags in a batch-method.

Good water permeable polypropylene fleece, which is coated with polyvinylchloride, was worked into 70×70 mm bags. The bags were respectively filled with approximately 10 ml ion exchanger resin.

For regeneration, the exchanger bags, which were completely loaded or charged with calcium and magnesium ions, were covered in a beaker with 40 ml of a regenerating solution, and were left standing 6–24 hours, preferably 6–12 hours, subject to occasional vigorous agitation or rotation. In all, the regeneration solution should be agitated or rotated at least 10 times.

a. Regeneration of a chelate-forming resin

A Lewatit-type ion exchanger, (TP 207), in the Ca/Mg-form was used as resin. 5 bags with a total content of 79.5 ml Ca/Mg-resin (corresponding to 86.5 mMol $Ca^{2+}$ +$Mg^{2+}$) were dissolved in 173 mMol $Na_3$ EDTA, added to 320 ml water (c≈0.5 Mol/l), and treated 24 hours as described above. Thereafter, the bags were removed and analyzed. After 24 hours, all bags were regenerated to 99%, which means they existed practically in pure $Na^+$ form.

b. Regeneration of a non-chelate-forming resin

A weak acid cation exchanger of the trademarked Lewatit CNP-LF-type in the Ca/Mg-form was filled into ten bags containing collectively 97 ml Ca/Mg resin (corresponding to 119.3 mMol $Ca^{2+}$ +$Mg^{2+}$). The bags were regenerated as described in 2a in 400 ml water containing 239 mMol $Na_3$EDTA. After 24 hours, the ion exchanger existed up to 99% in pure $Na^+$form.

The example shows the inventive high regeneration capacity of ion exchanger resins, regardless of whether they are in a position to form chelates themselves.

During corresponding tests with ion exchangers loaded or charged with $Cu^{2+}$-ions, a regenerating effect of 65–85% was discovered:

c. Regeneration of a $Cu^{2+}$ chelate resin with $K_2$[Ca EDTA] solution:

Resin bags filled with an ion exchanger of Lewatit-type TP 207 in the pure $Cu^2$ form, were generated, corresponding to 2a or 2b, with four times the volume of 0.2 or 0.4 molar $K_2$[Ca EDTA]-solution. With a mole ratio of 1:1 ($Cu^{2+}$:$K_2$[CaEDTA]=1:1), a regeneration effect of 68% was discovered. With a mole ratio of 1:2, this effect was 71%.

Since in the aquarium technology such a high $Cu^{2+}$-loading or charge never occurs, in practice also heavy metal ions are inventively quantitatively practically removable.

The $K_2$[Ca EDTA]-solution utilized is additionally very well suited to regenerate partially loaded or charged Ca/Mg-chelate resins while maintaining a not more precisely known Ca/Mg-ion ratio which corresponds to the existing water conditions. If a suitable resin, for example having a Ca:Mg ratio of 1.53:1, is regenerated with a one-molar solution of $K_2$[Ca-EDTA], the Ca:Mg-ratio remains substantially unchanged (1.56:1) while heavy metals of the transition series are quantitatively exchanged.

EXAMPLE 3

Regeneration of $Cu^{2+}$ chelate resin with $K_2$[Ca EDTA]+$K_2$[Mg EDTA] solutions at a selected Ca:Mg-ratio:

According to the operating instructions given in Example 2a, 10 ml $Cu^{2+}$ TP 207-resin were respectively regenerated with 60 ml of a mixture of $K_2$[Ca EDTA] and $K_2$[Mg EDTA].

The following Table II shows the connection between the ion ratios of the regenerating solution, and the obtained ion ratios on the regenerated resin:

TABLE II

| Regenerating solution of $K_2$ [Ca EDTA] +$K_2$ [Mg EDTA]; Ca:Mg-Ratio | Regeneration Effect | Ca:Mg-ratio on the resin |
| --- | --- | --- |
| 5:1 | 62% | 1.85:1 |
| 2:1 | 63% | 0.63:1 |
| 1:1 | 68% | 0.18:1 |
| 0.5:1 | 70% | 0.06:1 |
| 0.2:1 | 73% | 0.03:1 |

Accordingly, it is possible to select any desired Ca:Mg-ratio on the resin. The range covered by Table II corresponds to the usable ion ratio that conventionally arises in the aquarium technology.

Values above 1.85:1 can be produced after removal of the heavy metals with the utilized regeneration solution in a Ca:Mg-ratio of 5:1 by means of defined and higher concentrated $CaCl_2$+$MgCl_2$ solutions.

EXAMPLE 4

Adjustment of a particular Ca/Mg-ion ratio on a chelate-resin by regeneration with defined $K_2$[Ca EDTA]+$K_2$[Mg EDTA] solution mixtures.

10 ml Ca/Mg resin (TP 207; Ca:Mg=1.53:1) were treated with $K_2$[Ca EDTA]+$K_2$[Mg EDTA] solutions of defined content. 200 ml water were added to 60 ml of a one-molar solution. The equilibrium adjustment was completed with occasional stirring, within a period of 3 hours.

In the following Table III, the resulting Ca/Mg ion ratios on the ion exchanger resin are set forth:

TABLE III

| Regenerating Solution of $K_2$ [Ca EDTA] and $K_2$ [Mg EDTA] Ca:Mg-Ratio | Regenerated Resin Ca:Mg Ratio |
| --- | --- |
| Pure $K_2$[Ca EDTA] Solution | 1.56:1 |
| 7.6:1 | 1.15:1 |
| 5.7:1 | 1.0:1 |
| 5:1 | 0.9:1 |
| 2:1 | 0.4:1 |
| 1:1 | 0.18:1 |
| 0.5:1 | 0.07:1 |
| 0.2:1 | 0.04:1 |
| — | untreated Resin 1.53:1 |

From Table III, it is apparent that the Ca:Mg-ratio of the starting resin is practically unchanged if pure $K_2$[Ca EDTA] solution is used for regeneration, and that the Ca:Mg-ratio, however, tends or moves toward zero, if pure $K_2$[Mg EDTA]-solution is used.

Intermediate values can be ascertained or derived by interpolation from Table III.

The present invention is, of course, in no way restricted to the specific disclosure of the specification and examples, but also encompasses any modifications within the scope of the appended claims.

What I claim is:

1. A method of regenerating an ion exchange resin used in the treatment of water while attaining a desired calcium to magnesium-ion ratio in the range of about 1.15 to 0.04 to 1 in the regenerated resin, the method comprising the steps of rinsing the loaded resin with a solution containing calcium and magnesium chelates of potassium salts of EDTA with the calcium and magnesium ions included in a selected mole ratio in the range of about 7.6 to 1 to about 0.2 to 1 whereby the calcium to magnesium ratio in the regenerated resin decreases as the amount of magnesium chelates increases.

2. The method of claim 1 wherein the water being treated by the resin is aquarium water and wherein regeneration is accomplished by batch immersion in the treating solution.

* * * * *